United States Patent Office 3,795,732
Patented Mar. 5, 1974

3,795,732
DESULFURIZATION OF FLUE GASES
Joseph W. Fleming, Upper St. Clair Township, Allegheny County, Pa., assignor to Koppers Company, Inc.
Filed Dec. 17, 1971, Ser. No. 209,250
Int. Cl. C01b 17/00
U.S. Cl. 423—242　　　　　　　　　　　　　　7 Claims

ABSTRACT OF THE DISCLOSURE

A process and apparatus for removing sulfur oxides from combustion gases and the like in which the gases are contacted with vanadium pentoxide to convert any sulfur dioxides present therein to sulfur trioxide and absorbing the sulfur trioxide with lithium sulfate which is converted to lithium pyrosulfate. The lithium pyrosulfate can be converted back to lithium sulfate for reuse in the system and sulfur trioxide liberated thereby used in the production of sulfuric acid.

FIELD OF THE INVENTION

The present invention relates to a method and apparatus for the desulfurization of waste gases and, in particular, to the removal of sulfur dioxide from flue gases utilizing an absorption-desorption process comprising a carrier such as γ-alumina or silica impregnated with a mixture of vanadium pentoxide and lithium sulfate absorbent.

BACKGROUND OF THE INVENTION

Because of the frequent occurrence of sulfur in fuels, large amounts of sulfur dioxide are constantly being emitted into the atmosphere. The source of much of the sulfur dioxide emission comes from industrial waste gases such as flue gas from power plants, smelting of ores, petroleum refining, and the like. While the exact effects of sulfur dioxide upon such things as health and vegetation are largely unknown, there has, nevertheless, been a great deal of attention directed to the desulfurization of waste gases. Many proposals have been made including U.S. Pat. Nos. 3,501,897, 3,436,192, 3,524,720, 3,454,356, 3,508,868, 3,345,125, 3,363,401 and 2,992,895.

Of the proposed methods, the most common are those that employ a catalyst for oxidizing the sulfur dioxide gas to sulfur trioxide and a material for absorbing the sulfur trioxide. Typical of this type of system is that set forth by Van Helden et al., U.S. Pat. No. 3,501,897 where an alkali metal oxide or, preferably, copper oxide acceptor is supported on a carrier which is promoted with a vanadium compound such as vanadium pentoxide. The sulfur oxides are absorbed from the waste gases by the acceptor which is then regenerated by a suitable reducing gas, usually a low molecular weight hydrocarbon.

The primary consideration for the utilization of a particular system is the cost, both with respect to initial capital investment for equipment and its operating costs. All of the proposed systems involve expensive capital outlays and considerable operational expense, even when a saleable by-product results. Many of the systems lack flexibility in their ability to be adapted to effluent discharges having a wide range of sulfur oxide content. That is, the operating costs of some systems such as those utilizing alkalized alumina go down as the sulfur content of the fuel goes up. In other systems, such as the dolomite systems, the operating costs increase as the sulfur content in the fuel increases. However, in the latter case, small plant installations, e.g., 200 M.W. or less involves higher costs, whereas a large unit such as 1600 M.W. the cost increases are not too significant, see "Chemical Engineering Progress," September 1969.

The present invention is addressed to a desulfurization system which is adapted to provide reduced operating costs for plants utilizing fuels with either large or small sulfur contents. The invention further provides a degree of flexibility within its operating parameters to adjust to varying contents of sulfur dioxide in the effluent. Moreover, reduced operating costs are achieved irrespective of the designed removal rates; and high removal, less than 130 p.p.m., in the stack gases are obtainable.

SUMMARY OF THE INVENTION

The present invention comprises a system in which an absorbent and catalyst are impregnated upon a carrier which may be either in particulate or solid form. The absorbent is reactive at flue gas temperatures and may be regenerated at temperatures only slightly above the absorption temperatures. By only slight variation of the temperatures of regeneration or control of regenerating air volumes, wide degrees of absorption can be effectuated. Thus, flexibility and control as to the amount of sulfur oxides removed from the effluent can be accomplished with only small variations in the operating parameters. The flexibility and control are achieved with no sacrifice to operating costs or additional capital expenditures.

The present invention provides for the desulfurization of combustion gases by the simultaneous catalytic oxidation of sulfur dioxide to sulfur trioxide and the absorption of the sulfur trioxide on the absorbent material. The spent absorption material can thereafter be regenerated by heated air or gas. The absorbent comprises a silica or alumina carrier impregnated with vanadium pentoxide and lithium sulfate. The vanadium pentoxide acts as a catalyst for the oxidation of sulfur dioxide to sulfur trioxide. The lithium sulfate absorbs the sulfur trioxide at flue gas temperatures and is converted to lithium pyrosulfate. The lithium sulfate-sulfur trioxide reaction to pyrosulfate is reversible and by heating the pyrosulfate in a current of air or gas, sulfur trioxide is liberated and lithium sulfate regenerated.

The regenerated lithium sulfate-vanadium pentoxide absorbent is recycled back to the absorption reaction zone. The liberated sulfur trioxide is converted into either sulfuric acid or oleum by scrubbing the gases. Both of these steps help to lower the overall cost of operating the system. Because the absorbent can be regenerated, there is no need to continually replace it, and because it is regenerated at a low temperature differential from the absorption reaction, it has a greatly increased useful life. The sulfuric acid or oleum is a marketable byproduct which is useful in offsetting the operational costs.

The absorbent comprises a carrier on which the lithium sulfate-vanadium pentoxide is impregnated. Suitable carriers include γ-alumina, silica, silica-alumina, silica-magnesia, and the like. Silica and γ-alumina are particularly well suited to the present invention because of their large specific surface area. Preferably, the surface area of the carrier should be greater than 100 m.²/g.

The impregnation of the absorbent on the carrier as well as the incorporation of a reinforcing agent such as ball clay, if desired, can be carried out by methods known to those skilled in the art, for example, see U.S. Pat. No. 1,991,448. A suitable composition comprises, for example, about 67% silica and 33% lithium sulfate-vanadium pentoxide of which 20% of the salt is vanadium pentoxide. It is preferable to maintain or provide the carrier with an impregnation not greater than about 5 atoms in depth. Completely filling the pores of the carrier significantly reduces the surface area of absorbent and, thus, the efficiency thereof.

The impregnated carrier including a reinforcing agent can then be ground after drying to produce a particulate absorbent, or impregnation can be accomplished after grinding and sizing if desired. A size range of from 0.5 to 100 microns is suitable and a range of from 5.0 to 70 microns is preferred. The carrier can also be extruded into rods having a diameter of between 2 and 4 inches or formed into honeycomb baffle plates which are then dried.

Various types of apparatus may be utilized in the present invention to provide effective desulfurization with either a particulate or solid form absorbent. Therefore, to better understand the nature of the present invention as well as its advantages, the following detailed description of the presently preferred embodiment of the apparatus is provided in connection with the drawings.

PRESENTLY PREFERRED EMBODIMENTS OF THE INVENTION

Figure 1:
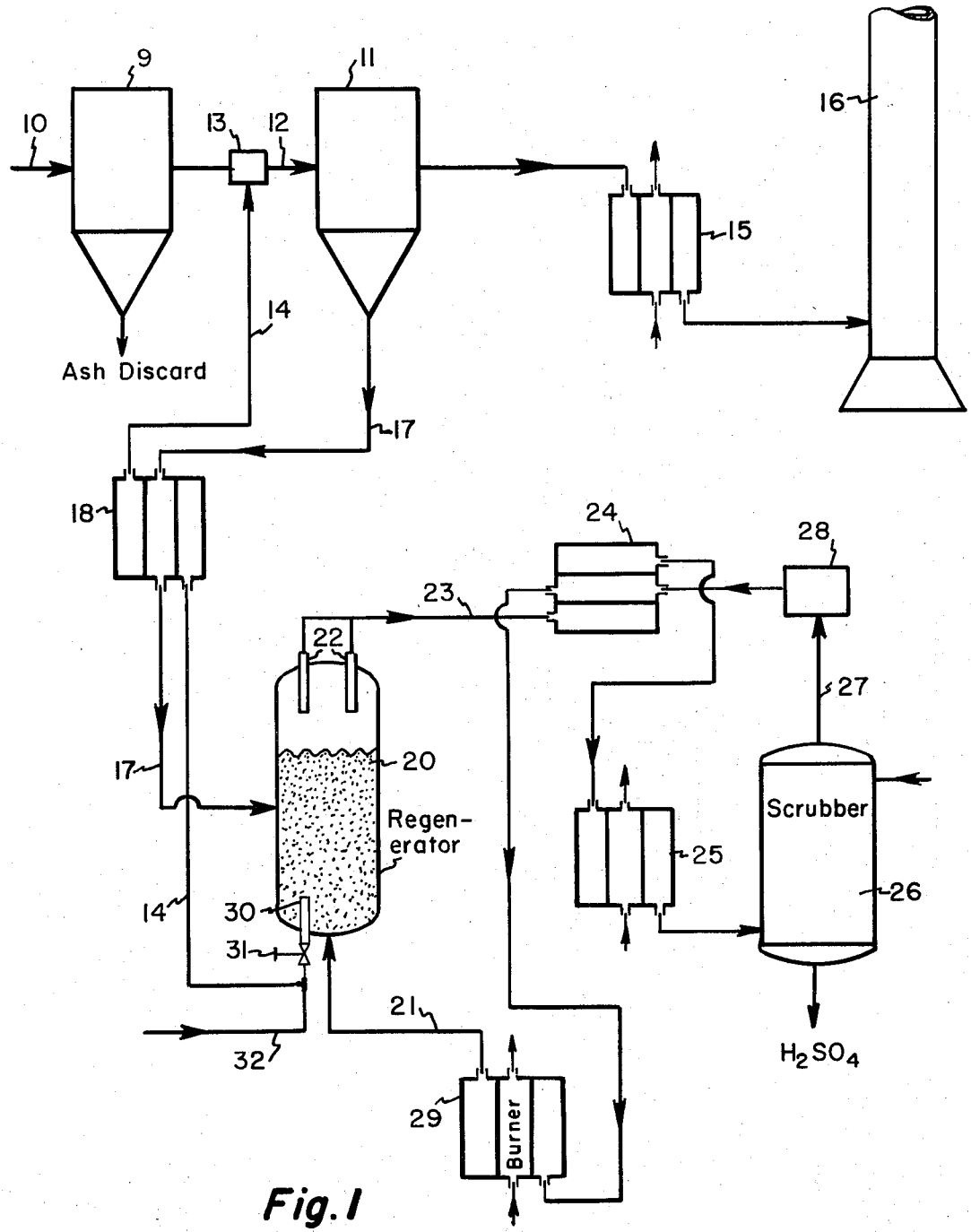
FIG. 1 is a diagrammatic layout of a desulfurization apparatus using a particulate absorbent.

Referring to FIG. 1, a desulfurization unit for utilizing a particulate absorbent is connected to a plant (not shown) having a sulfur dioxide containing effluent. The desulfurization unit is connected to the discharge end of a combustion furnace through line 10. An electrostatic precipitator 9 is connected to line 10 for removal of effluent particulate material, such as ash. A second electrostatic precipitator 11 is connected to precipitator 9 by line 12. Precipitator 11 is utilized for the removal of the particulate absorbent material which has been injected into the system by nozzle 13 located in line 12 between the two precipitators. The desulfurized waste gas is discharged through stack 16 after passing through a heat exchanger 15. Heat exchanger 15 reduces the temperature of the gas for discharge to the atmosphere, and can be utilized to preheat the combustion gases to the furnace.

Nozzle 13 is preferably of a type having a plurality of injection inlets well known in the art. By injection of the absorbent at a plurality of loci about the periphery of line 12, a more uniform dispersion of particles throughout the waste gas can be accomplished. While the reaction proceeds very rapidly and takes place in a relatively small section of the line, nozzle 13 is preferably located the maximum distance from precipitator 11, for example a distance equal to about two to four diameters of line 12.

The absorbent material collected by precipitator 11 is discharged through line 17 which passes through a heat exchanger 18 to increase the temperature of the absorbent. Preferably, heat transfer is accomplished by using the regenerated absorbent which must be cooled prior to dispersion into the waste gas line 12. Exchanger 18 can be utilized as a control for the temperature of absorbent prior to its injection to adjust the reaction media temperature.

The absorbent, after preheating, is fed to regenerator 20. The absorbent is regenerated in a fluidized bed by passage of hot air through the bed as is known in the art. The sulfur trioxide that is removed is discharged from the top of regenerator 20 through cyclone separators 22. The $SO_3$ gas mixture is discharged through line 23 and cooled by heat exchangers 24 and 25. The cooled $SO_3$ gas mixture is scrubbed in scrubber 26 with a dilute sulfuric acid to produce a concentrated sulfuric acid or oleum by-product. The scrubbed gas is thereafter sucked out of the scrubber by compressor or blower 28 through line 27.

Since the scrubbed gas is substantially free of sulfur trioxide, it is available for use to regenerate the absorbent. Recycling the scrubbed gas requires, however, that it be reheated to regeneration temperatures. This is accomplished by passing the air through heat exchangers 24 and 29. Heat exchanger 24 utilizes the heat from exit gases from regenerator 20 to increase the temperatures of the air to that slightly below the temperature of regenerator 20. Heat exchanger 29 is provided with a burner to make up the heat losses in the system as well as to provide regenerator 20 with air of the required temperature.

The heated air is then fed to regenerator 20 by line 21 with sufficient heat and pressure to maintain the fluidized bed reaction. The regenerated absorbent is discharged through stand pipe 30 and valve 31 into line 14. The pressure head of fluidized particulate absorbent is regulated by transport air 32 essentially by dilution. Also, the length of stand pipe 30 can be initially designed for a particular pressure head. The amount of particulate absorbent injected into line 12 is controlled by valve 31 and cooled by heat exchanger 18 to the desired temperature for injection into line 12.

The lithium sulfate-vanadium pentoxide can also be impregnated upon a carrier which takes various forms or shapes. For example, the carrier can be extruded as a rod or formed as honeycomb baffle plates. Particulate absorbent can be placed between wire mesh or the like to form various shapes which expose the absorbent to the effluent but which do not provide costly back pressures. An apparatus for utilizing this type of absorbent is shown in FIG. 2.

Figure 2:
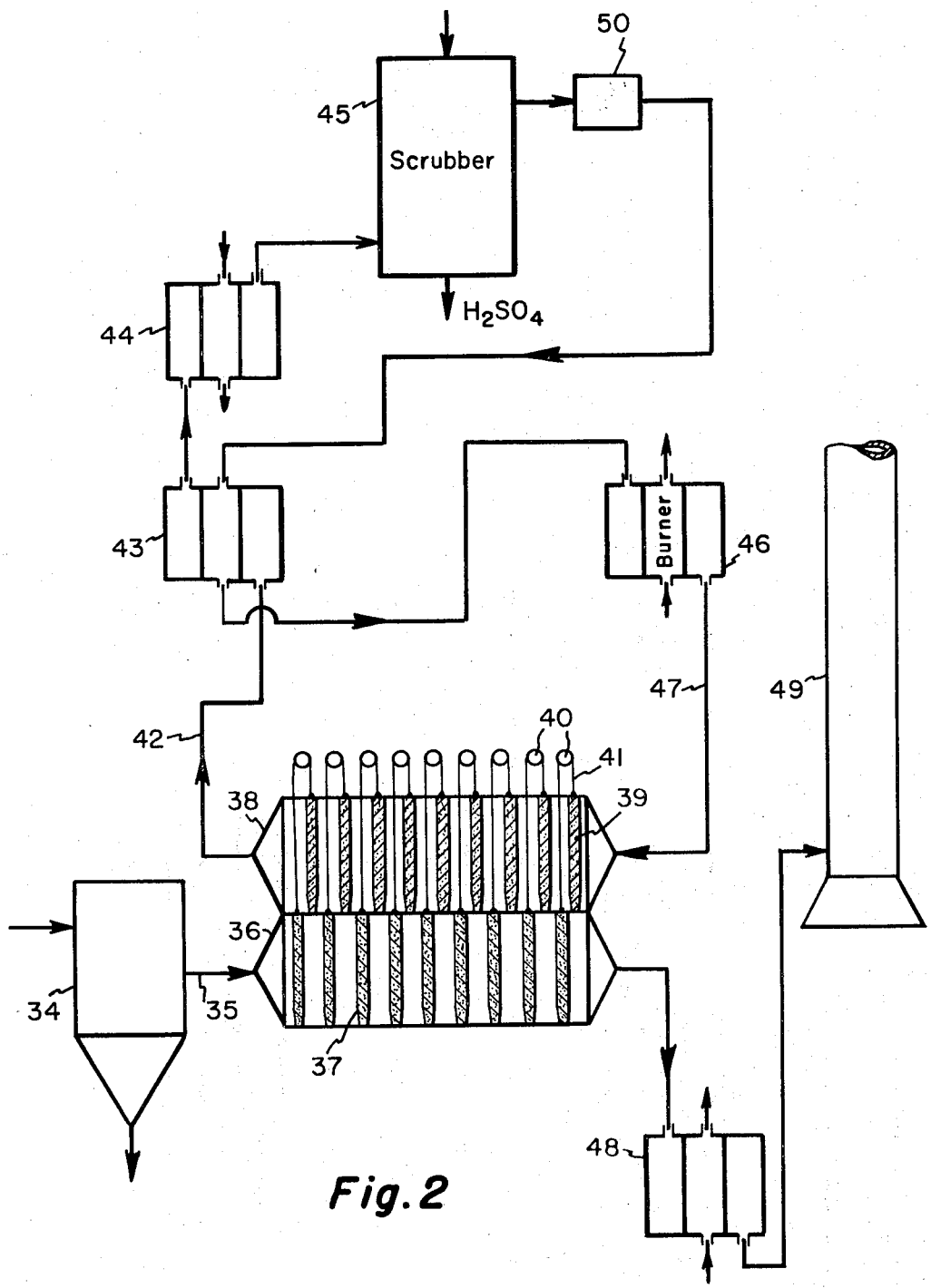
FIG. 2 is a diagrammatic layout of a solid mass absorbent apparatus.

Referring to FIG. 2, a flue gas is dischaged into electrostatic precipitators 34 and absorption chamber 36 by line 35. Absorption chamber 36 includes a plurality of movable rods 37 having impregnated thereon the lithium sulfate-vanadium pentoxide. On top of absorption chamber 36 is a like chamber 38, for regeneration of the rods. Regeneration chamber 38 includes a like number of rods 39. Rods 37 and 39 are positioned in such a manner as to permit exchange between the respective chambers. To facilitate exchange, it is preferred that each rod 37 be connected to an associated rod 39 by means of cable 41 trained about a pulley 40 to minimize the power requirements necessary to remove them.

Rods 37 are moved into chamber 38 for regeneration after they have absorbed substantially their capacity of sulfur dioxide. Simultaneously therewith, rods 39 are lowered into chamber 36. To prevent any sulfur dioxide from escaping into the atmosphere, the rods should be exchanged in seriatim.

It should be noted that in smaller installations, for example, boilers with a capacity up to 100,000 pounds of steam per hour, the rods, plates or the like can be stationary. In such case, a pair of crossover valves could be inserted to switch the flow of gases to the respective chambers. A valve could be inserted between lines 35 and 42 and between line 47 and line discharging into heat exchanger 48. This provides a more practical application because the size of the respective lines is much smaller.

The desulfurized effluent is discharged into the atmosphere through heat exchanger 48 and stack 49. Heated air is blown into regeneration chamber 38 in a countercurrent direction to that of the exhaust gases going through chamber 36. By so doing the rods near the exit end of chamber 36 will have been more completely regenerated which is preferable since the sulfur dioxide content of the gas at that end of the chamber is the lowest. That is, the last rods in the absorption chamber to be exposed to the effluent gases are the first rods to be exposed to the regeneration air. That means that these rods will be exposed to the highest air temperatures and to the lowest partial pressure of $SO_3$ in the regeneration air. Thus, these rods will have a very high ratio of $Li_2SO_4/Li_2S_2O_7$ and will be able to absorb the $SO_3$ formed by the vanadium oxidation of $SO_2$ to provide an extremely low concentration of sulfur oxide gases in the stack.

At the exit end of the regeneration chamber and input end of the absorption chamber, rods 39 will be exposed to a slightly lower air regeneration temperature and to a higher and significant $SO_3$ partial pressure. This will cause the $Li_2SO_4/Li_2S_2O_7$ ratio to be lower than that on the rods at the opposite end. Thus, these rods do not have a capacity to remove $SO_2/SO_3$ to a very low value. However, at the input end of the absorption chamber the concentration of $SO_2/SO_3$ is at its highest and, thus, a large $Li_2SO_4/Li_2S_2O_7$ ratio is not required for efficient removal.

The sulfur trioxide gas mixture is discharged through line 42 at the opposite end of chamber 39 and cycled through heat exchangers 43 and 44 to scrubber 45. The temperature is reduced from that of regeneration to that required for scrubbing to make either concentrated sulfuric acid or oleum. The scrubbed air is fed through compressor or blower 50 and heat exchangers 43 and 46, and from heat exchanger 46 by line 47 back to the regenerator 38. Since there is a loss of heat in the system, heat exchanger 46 includes a burner for making up the heat loss and controlling the temperature or regeneration air.

To further explain the nature of the invention and the flexibility provided thereby, the operating variations of $SO_2/SO_3$ equilibrium versus $Li_2SO_4/Li_2S_2O_7$ ratio versus selected temperatures has been tabularized in Tables I and II. The preferred temperatures of absorption are from 200° to 350° C. Regeneration is accomplished preferably at about 150° above the absorption temperatures where the temperatures of regeneration range from about 400° to 600° C.

TABLE I

[In absorber (Line 12, Fig. 1)]

| Temperature, ° C. | Ratio, $Li_2SO_4/Li_2S_2O_7$ | Mol fraction, $Li_2SO_4$ | Amount (p.p.m.) of $SO_2$ or $SO_3$ discharged through the stack |
|---|---|---|---|
| 250 | 0.2 | 0.17 | 110 |
|  | 0.5 | 0.33 | 46 |
|  | 0.8 | 0.44 | 29 |
| 275 | 0.2 | 0.17 | 470 |
|  | 0.5 | 0.33 | 190 |
|  | 0.7 | 0.41 | 130 |
|  | 0.8 | 0.44 | 120 |
|  | 1.0 | 0.50 | 90 |
| 300 | 0.5 | 0.33 | 680 |
|  | 0.8 | 0.44 | 430 |
|  | 1.7 | 0.63 | 200 |

TABLE II

[In regenerator (20)]

| Temperature, ° C. | Ratio, $Li_2SO_4/Li_2S_2O_7$ | Partial pressure $SO_3$ in atmospheres | Vol. percent $SO_3$ from regenerator |
|---|---|---|---|
| 425 | 0.2 | 0.24 | 24 |
|  | 0.5 | 0.097 | 9.7 |
|  | 0.8 | 0.060 | 6.0 |
| 450 | 0.8 | 0.15 | 15 |
|  | 1.0 | 0.12 | 12 |
|  | 1.2 | 0.10 | 10 |
|  | 1.4 | 0.085 | 8.5 |
|  | 1.5 | 0.079 | 7.9 |
| 500 | 1.5 | 0.34 | 34 |
|  | 2.0 | 0.25 | 25 |
|  | 3.0 | 0.17 | 17 |
|  | 5.0 | 0.10 | 10 |

In Table I, the ratio of $Li_2SO_4/Li_2S_2O_7$ and the mol fraction of $Li_2SO_4$ are taken as the absorbent is discharged from the precipitator at line 17. The discharge of $SO_2/SO_3$ is given in parts million at the stack. Table I provides a tabulation of the results in the absorption reaction at various temperatures and it is clear that as the temperatures increase, the absorbent is not removing as efficiently as at the lower temperatures for a given absorbent circulation.

In Table II, the ratio of $Li_2SO_4/Li_2S_2O_7$ is taken as the absorbent is fed to line 14 after regeneration. The partial pressure and volume percentage of $SO_3$ are taken at line 23 as the $SO_3$ is removed from the regenerator.

This means, for example, that the removal of $SO_2$ per mol of recirculated lithium compound requires that various operating points be maintained in equilibrium:

TABLE III

| Absorption reaction temp., ° C. | Regenerator temp., ° C. | Regenerator $SO_3$ conc., vol. percent | $SO_2$ in stack gas, p.p.m. | Mols $SO_2$ removed per mol lithium salt circulated |
|---|---|---|---|---|
| 250 | 450 | 10 | 46 | 0.21 |
| 275 | 450 | 7.9 | 130 | 0.19 |
| 300 | 500 | 10 | 200 | 0.20 |

Table III shows that there are various operating conditions which can remove the same amount of $SO_2$ for a given rate of solid circulation. Therefore, if 0.2 mol of $SO_2$ are to be removed for each mol of lithium salts recirculated, various temperatures are possible in the absorber and regenerator.

Thus, if a very low concentration of sulfur oxides in the effluent gas stream is desired, the absorber should be operated at a low temperature and a high residual ratio of lithium sulfate to pyrosulfate. For a high $$Li_2SO_4/Li_2S_2O_7$$

ratio in the absorber, either a rapid solid recirculation or a very high regeneration temperature is required.

In the regenerator, the ratio of $Li_2SO_4/Li_2S_2O_7$ is controlled by the temperature of regeneration and the volume of air used to sweep away the liberated $SO_3$; i.e., the partial pressure of $SO_3$ in the regenerator. The range of concentration of $SO_3$ in the sweep air is shown in Table II and is from approximately 6 to 34% by volume, but lower $SO_3$ concentration will increase the efficiency of $SO_2$ removal in the absorber.

Accordingly, the degree to which $SO_2$ is removed from the effluent gas is dependent upon the temperature within the absorber (line 12 or chamber 36) the amount of absorbent exposed to the effluent (with particulate absorbents this is adjustable within economical limits for any given design parameters) as well as the ratio of sulfate to pyrosulfate and the amount of $V_2O_5$ available. Other factors such as the amount of oxygen in the effluent are also considerations that must be taken into account, but these factors can be controlled by initial design of the plant and desired desulfurization systems.

The basic control within any given apparatus, however, is the temperatures of absorption and regeneration and the ratio of sulfate to pyrosulfate. That is, after the apparatus has been designed for a particular installation, the temperature of absorption and regeneration control the operation of desulfurization. It is clear that the initial design parameters for an 8000 M.W. power generating facility would be different from those of a 1000 M.W. facility. However, for a given installation the present invention provides great flexibility, control, and cost savings.

The following examples demonstrate the ability to vary the basic operating parameters to obtain a change in the amount of $SO_2/SO_3$ discharged to the atmosphere. Thus, an 8000 M.W. power generating facility using a fuel oil having about 3% sulfur would discharge approximately 1350 p.p.m. $SO_2$ into the atmosphere in a total gas flow of 1,450,000 s.c.f.m.

The initial design considerations would provide, for example, a particulate absorbent having 25% lithium sulfate and 5% vanadium pentoxide and total solids circula- of 1,450,000 s.c.f.m.

EXAMPLE I

A reduction to 130 p.p.m. $SO_2$ in the stack gas is achieved by operating the absorption temperature at 275° C. and injecting the absorbent into the absorption zone with a $Li_2SO_4/Li_2S_2O_7$ ratio of 1.5. At that rate of removal, an $Li_2SO_4/Li_2S_2O_7$ ratio of 0.7 would be discharged from precipitator 11 to the regenerator. A temperature of 450° C. would be maintained in the regenerator to regenerate to the desired 1.5 ratio of sulfate/pyrosulfate. In addition to the temperature control, the volume of the $SO_3$ in the regenerator must be maintained at about 7.9% and that can be accomplished by air circulation through the regenerator of 21,700 s.c.f.m.

With the system operating within that equilibrium state, approximately 28,900 lbs./hr. of 100% $H_2SO_4$ would be produced.

EXAMPLE II

A reduction of from 1350 p.p.m. to 170 p.p.m. $SO_2$ can be achieved by operating the absorption zone at 300° C. with a $Li_2SO_4/Li_2S_2O_7$ ratio injected into line 12 of 3.81 and a discharge ratio of 2.0. Regeneration of lithium salts from 2.0 to 3.81 is accomplished at a regeneration temperature of 500° C. with an $SO_3$ volume of 13.3% maintained by an air flow of 11,800 s.c.f.m. 100% $H_2SO_4$ would be produced at a rate of 28,000 lbs./hr.

EXAMPLE III

A reduction of from 1350 p.p.m. to 110 p.p.m. can be achieved by operating the absorption zone at 300° C. with a $Li_2SO_4/Li_2S_2O_7$ ratio injected into line 12 of 16.5 and discharged at 3.0. Regeneration of the lithium salts from 3.0 to 16.5 would require a regeneration temperature of 500° C. with an $SO_3$ volume of 3.1% maintained by an air flow of 59,200 s.c.f.m. 100% $H_2SO_4$ production would be approximately 29,300 lbs./hr.

Thus, by controlling the temperatures of the absorption and regeneration, as well as the air flow through the regenerator, the degree of desulfurization of the flue gases can be controlled.

While presently preferred embodiments of the invention have been shown and described, it may otherwise be embodied within the scope of the appended claims.

What is claimed is:

1. A method for removing sulfur oxides from combustion gases, said method comprising:
   (A) converting substantially all of any sulfur dioxide present in said combustion gases to sulfur trioxide by contacting at a temperature from between 200° C. to about 350° C. said combustion gas with vanadium pentoxide, and
   (B) absorbing from said combustion gases at said conversion temperature said converted sulfur trioxide and any sulfur trioxide present in said combustion gases with lithium sulfate to convert said lithium sulfate to lithium pyrosulfate.

2. A method as set forth in claim 1 including regenerating lithium sulfate from said lithium pyrosulfate by contacting said lithium pyrosulfate with a stream of gas at a temperature from between 100° C. to about 150° C. above said conversion-absorption temperature.

3. A method as set forth in claim 2 wherein said gas is air.

4. A method as set forth in claim 1 including converting said lithium pyrosulfate to lithium sulfate by contacting said lithium pyrosulfate with a gas at a temperature between 400 and 600° C.

5. A method for removing sulfur oxides from combustion gases comprising injecting a particulate absorbent comprising vanadium pentoxide and lithium sulfate to simultaneously convert any sulfur dioxide in said gas to trioxide and absorb said trioxides, and removing said particulate absorbent from said combustion gas.

6. A method as set forth in claim 5 wherein said particulate absorbent is subjected to a stream of heated gas after removal from said combustion gases, and is thereafter reinjected into the combustion gases.

7. A method as set forth in claim 6 wherein said gas is air.

References Cited

UNITED STATES PATENTS

| | | | |
|---|---|---|---|
| 3,615,196 | 10/1971 | Welty et al. | 423—244 |
| 3,345,125 | 10/1967 | Kruel et al. | 423—244 |
| 1,782,590 | 11/1930 | Wietzel et al. | 423—244 |
| 3,362,786 | 1/1968 | Buckhardt | 423—533 |

FOREIGN PATENTS

| | | | |
|---|---|---|---|
| 1,154,009 | 6/1969 | Great Britain | 423—244 |

OSCAR, R. VERTIZ, Primary Examiner

G. A. HELLER, Assistant Examiner

U.S. Cl. X.R.

252—461; 423—535

UNITED STATES PATENT OFFICE
CERTIFICATE OF CORRECTION

Patent No. 3,795,732  Dated March 5, 1974

Inventor(s) Joseph W. Fleming

It is certified that error appears in the above-identified patent and that said Letters Patent are hereby corrected as shown below:

Column 4, line 39, "remove" should read --move--;

Column 5, line 18, "or" should read --of--;

Column 6, line 66, "of 1,450,000 s.c.f.m." should read --tion of about 900,000 lbs/hr.--.

Signed and sealed this 16th day of July 1974.

(SEAL)
Attest:

McCOY M. GIBSON, JR.
Attesting Officer

C. MARSHALL DANN
Commissioner of Patents